United States Patent
Hughes et al.

(10) Patent No.: US 10,161,833 B2
(45) Date of Patent: Dec. 25, 2018

(54) BUILDING ENVIRONMENT DATA COLLECTION SYSTEMS

(71) Applicant: Battelle Memorial Institute, Richland, WA (US)

(72) Inventors: Michael A. Hughes, Pasco, WA (US); James R. Skorpik, Kennewick, WA (US); Michael R. Brambley, Richland, WA (US); Eric G. Gonzalez, Richland, WA (US); Yunzhi Huang, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 408 days.

(21) Appl. No.: 14/835,407

(22) Filed: Aug. 25, 2015

(65) Prior Publication Data
US 2016/0054910 A1 Feb. 25, 2016

Related U.S. Application Data

(60) Provisional application No. 62/041,517, filed on Aug. 25, 2014.

(51) Int. Cl.
*G06F 3/048* (2013.01)
*G01M 99/00* (2011.01)
*H04L 12/28* (2006.01)

(52) U.S. Cl.
CPC ........ *G01M 99/005* (2013.01); *H04L 12/2827* (2013.01)

(58) Field of Classification Search
CPC .................. G01M 99/005; H04L 12/2827
(Continued)

(56) References Cited

U.S. PATENT DOCUMENTS 5,481,481 A 1/1996 Frey et al.
9,625,885 B2 * 4/2017 Brun ..................... G05B 15/02
(Continued)

OTHER PUBLICATIONS

Brambley et al., "A Sensor System for Use in Commissioning Existing Small Commercial Buildings", Future of Instrumentation International Workshop (FIIW) 2012, Oct. 2, 2012, United States, 13 pages.
(Continued)

*Primary Examiner* — David Phantana-angkool
(74) *Attorney, Agent, or Firm* — Wells St. John P.S.

(57) ABSTRACT

Building environment data collection systems and methods are described. According to one aspect, a system includes a plurality of sensor devices which store different types of environment data, a base system comprising a plurality of interface devices configured to receive the environment data from the sensor devices, storage circuitry configured to store the environment data, and communications circuitry configured to implement communications, and a user interface apparatus comprising communications circuitry configured to communicate with the communications circuitry of the base system, a user interface configured to receive user inputs during installation of the sensor devices, and processing circuitry configured to control the user interface to generate the displayed information and to process the user inputs received via the user interface, and wherein different ones of the sensor devices are configured to generate the different types of environment data as a result of the user inputs.

29 Claims, 7 Drawing Sheets

(58) Field of Classification Search
USPC .......................................................... 715/735
See application file for complete search history.

(56) References Cited

U.S. PATENT DOCUMENTS

| | | | | |
|---|---|---|---|---|
| 9,727,667 | B2* | 8/2017 | Cockburn | G06T 15/00 |
| 9,746,199 | B1* | 8/2017 | Drees | F24F 11/053 |
| 9,915,991 | B2* | 3/2018 | Zhang | G06F 1/324 |
| 9,965,016 | B2* | 5/2018 | Trifonov | G05B 15/02 |
| 2004/0163073 | A1* | 8/2004 | Krzyzanowski | H04L 12/2803 |
| | | | | 717/107 |
| 2008/0201753 | A1* | 8/2008 | Arling | H04L 12/2805 |
| | | | | 725/114 |
| 2012/0011233 | A1* | 1/2012 | Dixon | H04L 65/1073 |
| | | | | 709/221 |
| 2012/0192076 | A1* | 7/2012 | Rocca | G06Q 10/06311 |
| | | | | 715/738 |
| 2012/0323382 | A1* | 12/2012 | Kamel | G05F 1/66 |
| | | | | 700/286 |
| 2014/0282458 | A1* | 9/2014 | Gupta | G06F 8/65 |
| | | | | 717/168 |
| 2015/0042240 | A1* | 2/2015 | Aggarwal | H04L 12/2803 |
| | | | | 315/292 |
| 2015/0242769 | A1* | 8/2015 | Kezeu | G06Q 10/063 |
| | | | | 705/7.11 |
| 2015/0312696 | A1* | 10/2015 | Ribbich | H04W 4/001 |
| | | | | 455/418 |
| 2016/0054910 | A1* | 2/2016 | Hughes | G01M 99/005 |
| | | | | 715/735 |
| 2016/0070244 | A1* | 3/2016 | Cipollo | G05B 15/02 |
| | | | | 700/275 |
| 2016/0327298 | A1* | 11/2016 | Sinha | F24F 11/0012 |
| 2016/0327921 | A1* | 11/2016 | Ribbich | F24F 11/0086 |
| 2016/0330285 | A1* | 11/2016 | Brophy | H04L 67/125 |
| 2017/0011616 | A1* | 1/2017 | Britton | G08B 25/008 |
| 2017/0124838 | A1* | 5/2017 | Sinha | G05B 19/048 |
| 2017/0234562 | A1* | 8/2017 | Ribbich | F24F 11/0012 |
| | | | | 700/277 |
| 2017/0256146 | A1* | 9/2017 | Roosli | G08B 7/06 |

OTHER PUBLICATIONS

Brambley, "Sensor Needs for Smarter Buildings: Examples from the U.S. Department of Energy", Sensors Expo & Cenference, Jun. 4-6, 2013, United States, 36 pages.

Mills, "Building Commissioning: A Golden Opportunity for Reducing Energy Ccsts and Greenhouse Gas Emissions", California Energy Commission, Public Interest Energy Research Prcgram, U.S. Department of Energy Contract No. DE-AC02-05CH11231, 2009, United States, 64 pages.

Brambley et al., U.S. Appl. No. 62/041,517, filed Aug. 25, 2014, titled "Retro-Commisioning Sensor Suitcase", 175 pages.

* cited by examiner

FIG. 10 ically to a common interval or period, such as every minute for an implementation to collect lighting or operational data of the packaged unit 18, or every five minutes for an implementation to collect indoor or outdoor temperature.

BUILDING ENVIRONMENT DATA COLLECTION SYSTEMS

RELATED PATENT DATA

This application claims the benefit of U.S. Provisional Patent Application Ser. No. 62/041,517 filed Aug. 25, 2014, titled "Retro-Commissioning Sensor Suitcase", the disclosure of which is incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

TECHNICAL FIELD

This disclosure relates to building environment data collection systems.

BACKGROUND OF THE DISCLOSURE

Existing buildings account for about 40% of US energy consumption and more than 70% of electricity consumption. Small commercial buildings are ubiquitous, with buildings less than 25,000 $ft^2$ accounting for 89% of commercial buildings and 37% of total commercial floor space and buildings less than 50,000 $ft^2$ accounting for 95% of commercial buildings and 50% total commercial floor space. However, small commercial buildings are generally not commissioned because there is a perception that it is too complex and costly for small buildings.

Commissioning is a process for ensuring that a newly constructed building operates as the owner and/or designer intended and the building staff are prepared to operate and maintain the building and its systems. Commissioning begins during design and continues through construction, turnover to occupants, and operation.

Retro-commissioning is the application of commissioning to existing buildings that have not been previously commissioned and focuses on improving the state of a building and its operations, often for purposes of improving the building energy efficiency and performance of the systems. Re-commissioning is the process of commissioning a building that has already been commissioned. Retro-commissioning is often used synonymously with re-commissioning in addition to its primary definition.

At least some aspects of the present disclosure are directed towards methods and apparatus for retro-commissioning of buildings including small commercial buildings.

BRIEF DESCRIPTION OF THE DRAWINGS

Example embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

At least some aspects of the present disclosure are directed to apparatus and methods of collecting environment data from a building for use in retro-commissioning of the building. For example, different types of environment data such as information regarding room air temperature, outdoor air temperature, diffuser air temperature, indoor lighting and operational modes of a heating, ventilating and air conditioning (HVAC) system is collected over a period of time using a plurality of sensor devices. The data is downloaded from the sensor devices to a base system for storage. Thereafter, the data may be analyzed to make recommendations for making the building more efficient.

Figure 1:
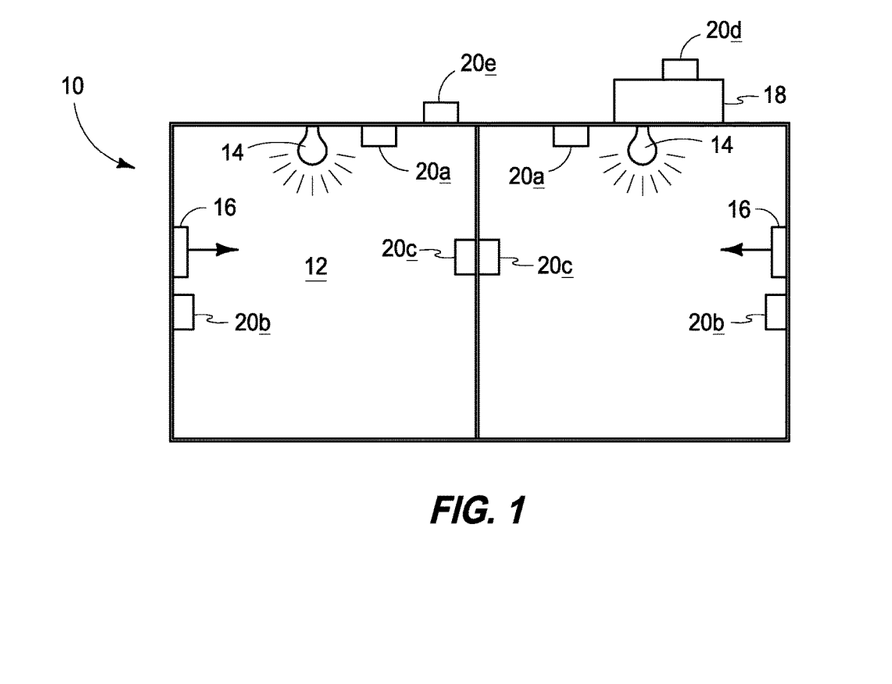
FIG. 1 is an illustrative representation of sensor devices installed in a building according to one embodiment.

Referring to FIG. 1, an example of a small commercial building 10 which includes a plurality of indoor rooms 12 with light sources 14 is shown. The commercial building 10 has a heating, ventilating and air conditioning (HVAC) system which includes a plurality of diffusers 16 which introduce conditioned and ventilation air from one or more packaged units 18 into rooms 12. In one embodiment, a packaged unit 18, such as a packaged heat pump or packaged air conditioner, includes a compressor, evaporator, expansion device, condenser, and supply fan. Individual rooms 12 may include thermostats (not shown) which control the operational modes of the packaged units 18 and thereby the introduction of heated or cooled air or unconditioned ventilation air via respective diffusers 16 into rooms 12.

A plurality of sensor devices 20a-20e are also shown in FIG. 1 which are configured to generate and collect different types of environment data for different locations of a building, such as different indoor rooms as well as outside locations including the roof and exterior walls. The environment data may be generated and stored at a plurality of different moments of time over a period of time, such as three to six weeks. In a more specific embodiment, the sensor devices 20a-20e generate and store environment data according to a common interval or period, such as every minute for an implementation to collect lighting or operational data of the packaged unit 18, or every five minutes for an implementation to collect indoor or outdoor temperature.

In the illustrated example, sensor devices 20a are configured and positioned to generate and store lighting data from respective light sources 14 within rooms 12 (e.g., the lighting data indicates whether the light sources 14 are on/off or an amount of light sensed), sensor devices 20b are configured and positioned to generate and store temperature data of the air flowing from respective diffusers 16, sensor devices 20c are configured and positioned to generate and store ambient room air temperature data of respective rooms 12, sensor device 20d is configured and positioned to generate and store vibration data of packaged unit 18 which may be used to determine the operational mode of packaged unit 18 including on (heating or cooling), off or in circulation/fan-only mode, and sensor device 20e is configured and positioned to generate and store outdoor air temperature data. In one embodiment, sensor devices 20a-20e used to generate and store the different types of environment data may have the same components but may be configured differently during installation to acquire the different types of environment data during data collection as discussed in additional detail below.

Figure 2:
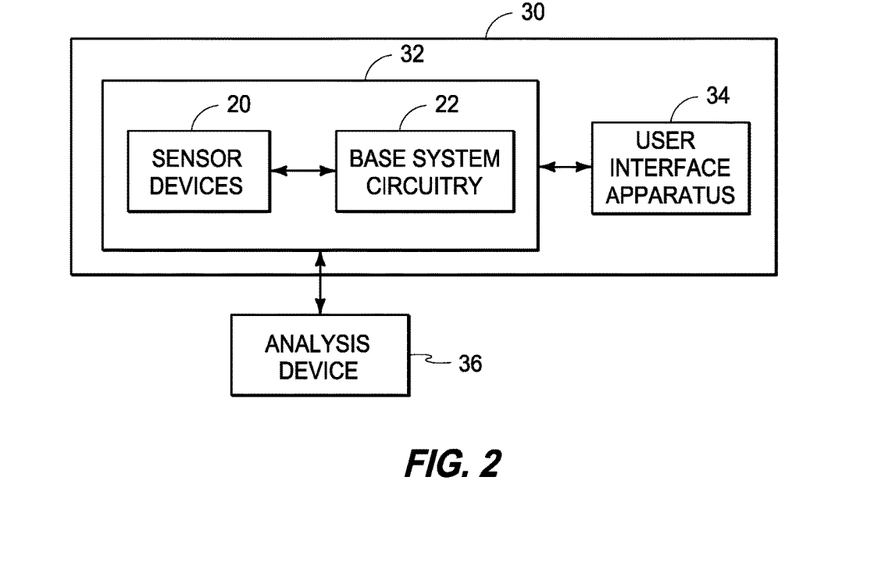
FIG. 2 is a functional block diagram of a building environment data collection system according to one embodiment.

Referring to FIG. 2, one embodiment of a building environment data collection system 30 is shown. The depicted data collection system 30 includes a base system 32 and a user interface apparatus 34 which is configured to communicate with base system 32.

In one embodiment, base system 32 is portable and is intended to be transported to the building where the environment data is to be collected for retro-commissioning. In one specific implementation, base system 32 is implemented within a carrying case. The base system includes a plurality of sensor devices 20 and associated circuitry 22 configured to interact with the sensor devices 20. The sensor devices 20 are removable from the base system 32 and may be installed at different locations throughout a building to collect one or more different types of environment data regarding the building.

User interface apparatus 34 is configured to communicate with base system 32. In one embodiment, user interface apparatus 34 is implemented as a portable computing device, such as a notebook computer, tablet computer, smartphone, etc. User interface apparatus 34 includes appropriate programming to assist a user with the installation of the sensor devices 20 within a building as described in one embodiment below. For example, user interface apparatus 34 is programmed, via a downloaded application in one embodiment, to assist users with installation of the sensor devices 20 and who may be familiar with a commercial building (e.g., custodian, maintenance personnel) but may be unskilled with respect to collection of environment data.

Following collection of environment data by the sensor devices 20 over a period of time, the sensor devices 20 are retrieved from their respective locations of a building and placed back into the base system 32 in one embodiment. The environment data of the sensor devices 20 is downloaded and stored within the base system circuitry 22. The environment data is thereafter downloaded from the base system 32 and analyzed using an analysis device 36, such as a personal computer. The analysis device 36 processes the environment data to provide recommendations to improve the efficiency of the building in one operational embodiment. Some example recommendations to improve the efficiency resulting from the analysis of the environment data are: incorrect schedules for temperature control relative to occupancy, the set point dead bands are too narrow, over/under heating or cooling, setbacks for temperature, compressor or condenser failure of the packaged unit, short-cycling of the packaged unit, fan failures of the packaged unit, and excessive daytime/nighttime lighting.

Figure 3:
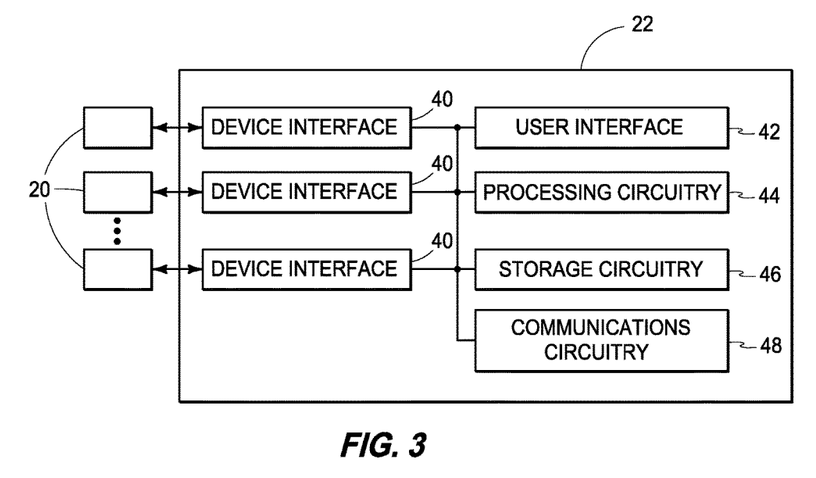
FIG. 3 is a functional block diagram of circuitry of a base system according to one embodiment.

Referring to FIG. 3, an example arrangement of base system circuitry 22 is shown and includes a plurality of interface devices 40, a user interface 42, processing circuitry 44, storage circuitry 46, and communications circuitry 48. Other embodiments are possible including more, less and/or alternative components.

Interface devices 40 individually include a data connection, such as a smart cable, for coupling with a sensor device 20. Interface devices 40 and base system circuitry 22 receive the collected environment data from the sensor devices 20 in one embodiment. The environment data is stored using base system circuitry 22 in one embodiment. In addition, and as described below in an example embodiment, configuration data may be applied from the base system circuitry 22 to the sensor devices 20 to configure the sensor devices 20 to collect specified types of environment data in different applications. In addition, interfaces 40 may also provide charging electrical energy to the sensor devices 20 if such are equipped with rechargeable batteries.

In one embodiment, user interface 42 is configured to interact with a user and may include a power switch and status indicators (e.g., power and battery status) which convey data to a user. User interface 12 may be configured differently in other embodiments.

In one embodiment, processing circuitry 44 is arranged to process data, control data access and storage, issue commands, and control other desired operations. Processing circuitry 44 may comprise circuitry configured to implement desired programming provided by appropriate computer-readable storage media in at least one embodiment. For example, the processing circuitry 44 may be implemented as one or more processor(s) and/or other structure configured to execute executable instructions including, for example, software and/or firmware instructions. Other example embodiments of processing circuitry 44 include hardware logic, PGA, FPGA, ASIC, state machines, and/or other structures alone or in combination with one or more processor(s). These examples of processing circuitry 44 are for illustration and other configurations are possible.

Storage circuitry 46 is configured to store programming such as executable code or instructions (e.g., software and/or firmware), electronic data, databases, or other digital information and may include computer-readable storage media. At least some embodiments or aspects described herein may be implemented using programming stored within one or more computer-readable storage medium of storage circuitry 46 and configured to control appropriate processing circuitry 44. The environment data which is collected by the sensor devices 40 and downloaded to the base system circuitry 22 is stored using storage circuitry 46 in one embodiment.

The computer-readable storage medium may be embodied in one or more articles of manufacture which can contain, store, or maintain programming, data and/or digital information for use by or in connection with an instruction execution system including processing circuitry 44 in one embodiment. For example, computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Communications circuitry 48 is arranged to implement communications of base system 32 with respect to external devices, such as user interface apparatus 34 and analysis device 36. For example, communications circuitry 46 may communicate information bi-directionally with respect to the external devices and include hardware for wired connections (e.g., network interface card (NIC), Ethernet port, serial or parallel connections, USB port, Firewire interface), and/or circuitry for wireless connections (e.g., Bluetooth, Cellular, GPS, WiFi, etc.).

Figure 4:
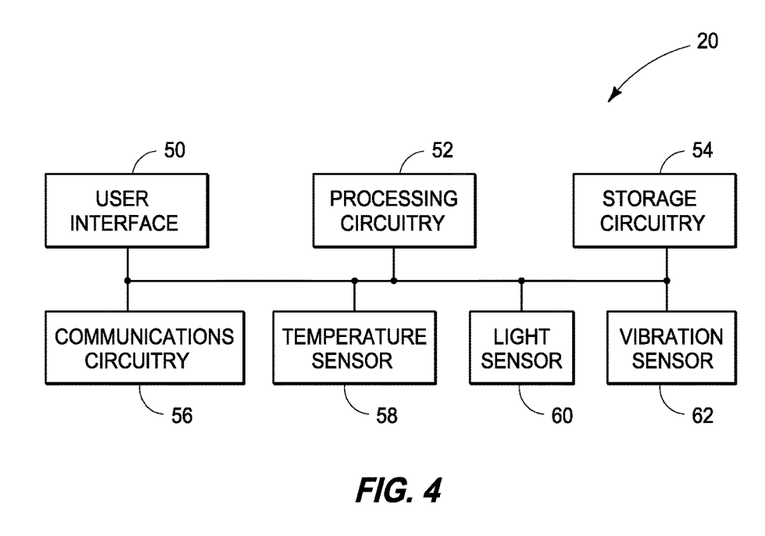
FIG. 4 is a functional block diagram of circuitry of a sensor device according to one embodiment.

Referring to FIG. 4, an example arrangement of a sensor device 20 is shown and includes a user interface 50, processing circuitry 52, storage circuitry 54, communications circuitry 56, a temperature sensor 58, a light sensor 60, and a vibration sensor 62. Other embodiments are possible including more, less and/or alternative components.

User interface 50 includes indicators which include the operational status of the respective sensor device 20, such as battery status, power on/off and configuration status.

Processing circuitry 52 may be configured similarly to processing circuitry 44 discussed above and control operations of the respective sensor device 20. For example, processing circuitry 52 may control activation of the sensors as well as generation of environment data and storage of the environment data.

Storage circuitry 54 may be configured similarly to storage circuitry 46 discussed above and circuitry 54 stores environment data within the sensor device 20.

Communications circuitry 56 is configured to couple with interface device 40 and receive data from base system circuitry 22 and output data thereto.

A temperature sensor 58 is configured to generate temperature environment data indicative of a sensed temperature at the location of the building where the sensor device 20 is installed.

A light sensor 60 is configured to generate lighting environment data indicative of an amount of light sensed by the sensor device 20.

A vibration sensor 62 is configured to generate vibration environment data indicative of vibrations sensed by the sensor device 20. For example, the sensor device 20 may be installed upon a packaged unit in a manner to sense vibrations of the packaged unit during HVAC operations, such as heating, cooling and ventilation. The vibration data may be processed to indicate the operational mode of the packaged unit (e.g., on, off, ventilation).

The user interface apparatus 34 and analysis device 36 may each include circuitry similar to the circuitry of base system circuitry 22 and sensor device 20. For example, user interface apparatus 34 and analysis device 36 each include a user interface, processing circuitry, storage circuitry and communications circuitry in one embodiment. Communications circuitry of the user interface apparatus 34 may communicate with base system 32 via WiFi or Bluetooth in illustrative examples. Processing circuitry of the user interface apparatus 34 controls its user interface to display images or text, for example in a graphical user interface, as well as process user inputs received via the user interface in one embodiment.

Figure 5:
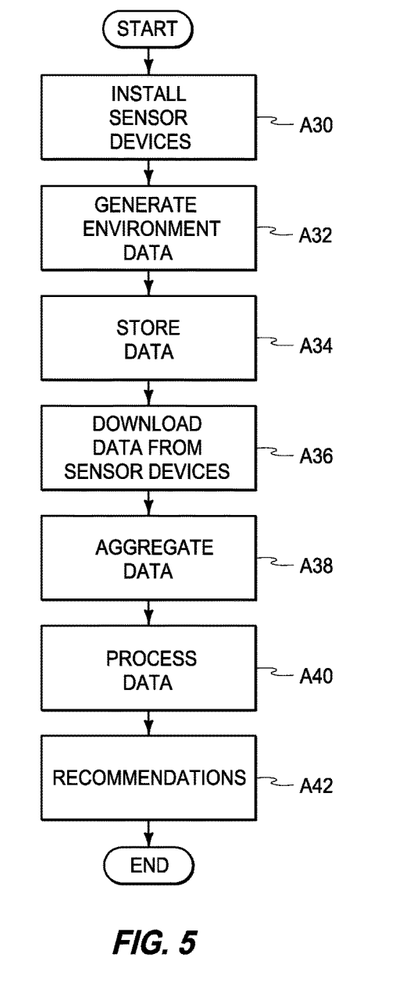
FIG. 5 is a flow chart of a method of collecting and analyzing environment data of a building according to one embodiment.

Referring to FIG. 5, one operational method of implementing and using the building environment data collection system is illustrated according to one embodiment. Other embodiments are possible including more, less and/or alternative acts.

At an act A30, the sensor devices are installed in different locations of a building to generate and store environment data which is indicative of the environment about the sensor device. During installation, a sensor device is configured by a user to sense one of a plurality of different types of environment data, such as temperature, light or vibration environment data. In one embodiment, the user interface apparatus 34 is configured to display installation instructions to assist a user with the installation of the sensor devices to generate and store the desired type of environment data as described in additional detail below with respect to FIG. 6.

Different ones of the sensor devices may be configured to generate and store different types of environment data from different locations of the building in one embodiment. In addition, a given sensor device may be configured to generate and collect a first type of environment data in one building and later be reconfigured to generate and collect a second type of environment data in another building in one embodiment.

At an act A32, the installed sensor devices generate environment data regarding the building. The sensor devices generate the environment data for the entire duration of the installation until the sensor devices are retrieved in one embodiment. The sensor devices generate the environment data at a constant rate or interval in one arrangement. In addition, the sensor devices also log time data with different samples of the environment data in one embodiment. For example, the time data may indicate the day/time when the associated environment data was generated in a given sample.

At an act A34, the environment data is stored internally within the sensor device in one embodiment.

At an act A36, the sensor devices are retrieved from their installed locations in the building and placed in the base system 32, and the collected environment data is downloaded from the sensor devices 20 to the base system circuitry 22 and stored within the circuitry 22 in one embodiment.

At an act A38, the environment data from each of the sensor devices 20 which were installed in the building is aggregated and communicated from the base system 32 to the analysis device 36, for example via an Ethernet connection.

At an act A40, the analysis device processes the collected environment data.

At an act A42, the analysis device outputs recommendations to increase the efficiency of the building.

Following downloading of environment data from the sensor devices 20 to the base system 32, the sensor devices 20 may be reused to generate and collect environment data for other installations in other buildings, and may be reconfigured to generate and collect other types of environment data in the different installations.

Figure 6:
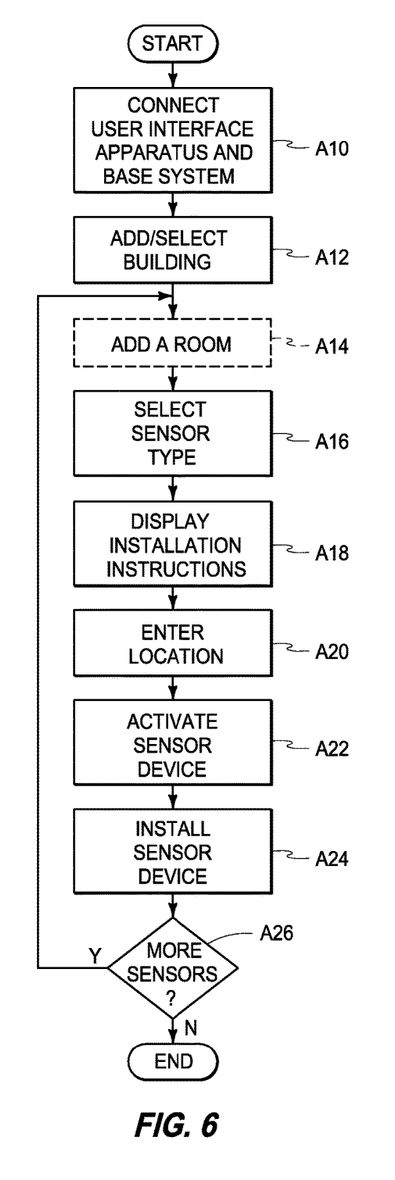
FIG. 6 is a flow chart of a method of installing sensor devices within a building according to one embodiment.

Referring to FIG. 6, one method of installing sensors is shown according to one embodiment. Other embodiments are possible including more, less and/or alternative acts.

At an act A10, the user interface apparatus and base system are connected, for example via a WiFi or Bluetooth connection.

At an act A12, the user interface apparatus executes an application to assist the user with the installation of the sensor devices. In one implementation, the user interface apparatus displays a user interface to assist a user with selecting a previously entered building or entering a new building where environment data will be collected.

An optional act A14 is provided if a sensor device is to be installed inside of the building. In particular, the user interface apparatus may depict a user interface such the screenshot shown in FIG. 7 to assist a user with selecting or identifying an appropriate room for the installation as discussed in additional detail below.

At an act A16, the sensor type is selected by the user to generate one of a plurality of different types of environment data to be collected in the given implementation (e.g., temperature, lighting, or vibration data). In one embodiment, the user interface apparatus generates a user interface, such as the screenshot shown in FIG. 8 to assist the user with the selection of the type of sensor and type of environment data to be collected.

Figure 9:
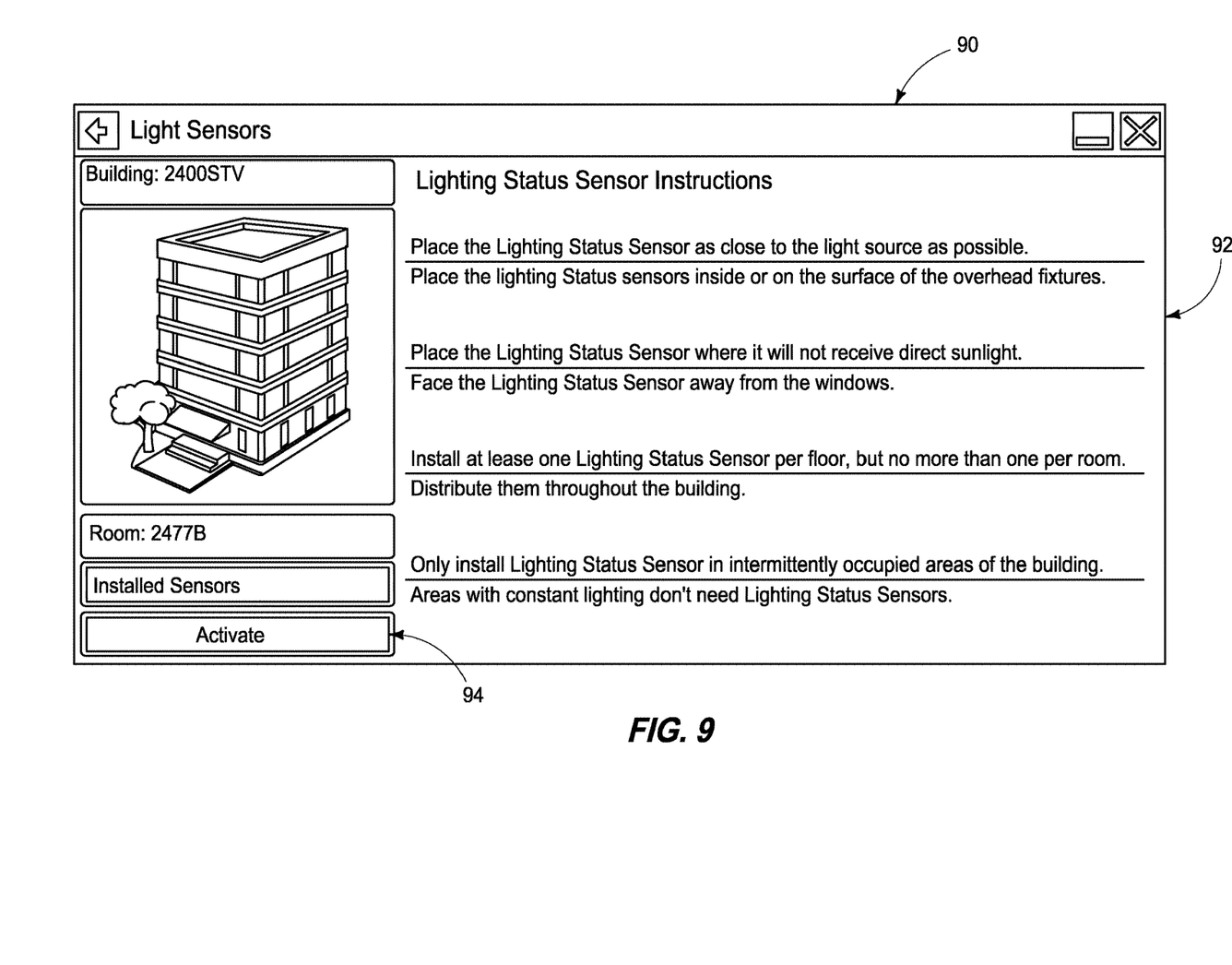
FIG. 9 is a screenshot of a display screen of a user interface including installation instructions for a lighting sensor device according to one embodiment.

At an act A18, the user interface apparatus displays installation instructions, for example as shown in the screenshot of FIG. 9 discussed below. The instructions may include text, drawings and/or photographs to assist the user with the proper installation of the sensor device tailored to the type of environment data to be collected. For example, a first set of installation instructions may be displayed to assist the user with installing a sensor device to generate a first type of environment data and a second set of installation instructions may be displayed to assist the user with installing a sensor device to generate a second type of environment data.

At an act A20, following review of the instructions for installation and determination of the location where the sensor device is to be installed, additional information regarding the location of the installed sensor may be entered by the user (e.g., "above the door"), for example using the screenshot of the user interface shown in FIG. 9 and discussed below.

At an Act A22, the appropriate sensor device is activated for installation and use. For example, the user interface apparatus communicates the type of environment data to be collected using the sensor device and information regarding the location of the installation of the sensor device (e.g., building, room, location in the room, roof, exterior location, etc.) to the base system. The base system circuitry downloads the information to the appropriate sensor device. The sensor device uses the received data to configure itself to generate and collect the specified type of environment data. For example, if lighting environment data is to be collected, the sensor device activates or configures the lighting sensor to generate lighting environment data indicative of the amount of light received at the location where the sensor device is installed while the temperature sensor, vibration circuitry and associated circuitry are configured to be inactive. Processing circuitry of the sensor devices controls the activation of desired sensor circuitry of the devices for use in different implementations in one embodiment.

In addition, the location information regarding the location of the installed sensor device is stored internally of the respective sensor device and may be read later to associate the collected environment data to the appropriate location where the data was sensed in the building.

At an act A24, the sensor device is installed at the specified location in accordance with the installation instructions and begins to generate and store the environment data.

At an act A26, it is determined if there are additional sensor devices to be installed, and if so, the process returns to act A14 to assist the user with the installation of a subsequent sensor device.

Referring to FIGS. 7-10, a plurality of screenshots generated by user interface apparatus 34 to assist a user with installing sensor devices are shown according to one embodiment.

Figure 7:
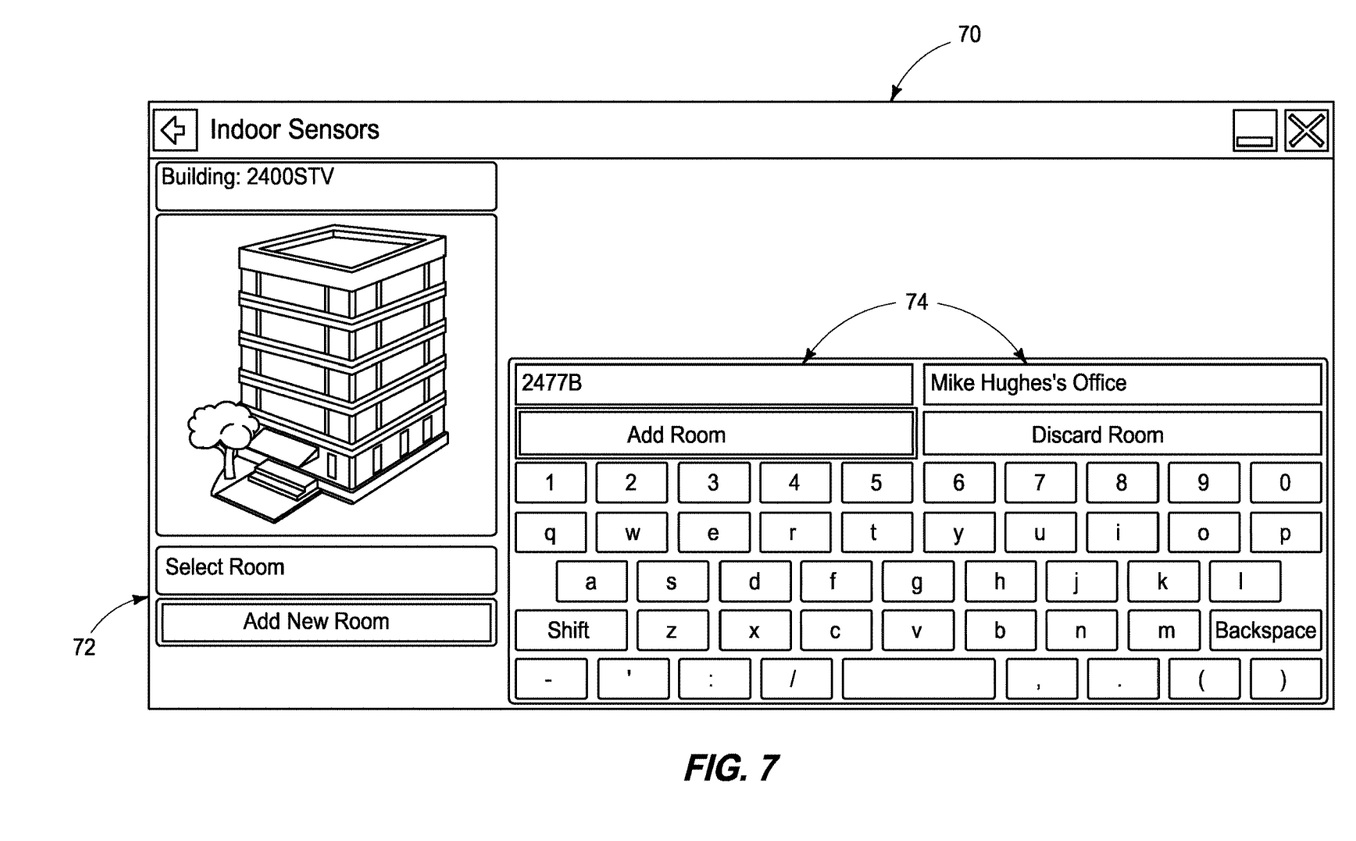
FIG. 7 is a screenshot of a display screen of a user interface for selecting a room within a building according to one embodiment.

FIG. 7 shows a screenshot 70 which is displayed as a result of a user selecting an option to install an indoor sensor. The user may use window 72 to select an existing room of the building or add a new room where the sensor device is to be installed. In the example of FIG. 7, the user adds location information (e.g., room number 2477B and Mike Hughes' Office) via interface 74 to identify a new room and the user selects the add new room option.

Figure 8:
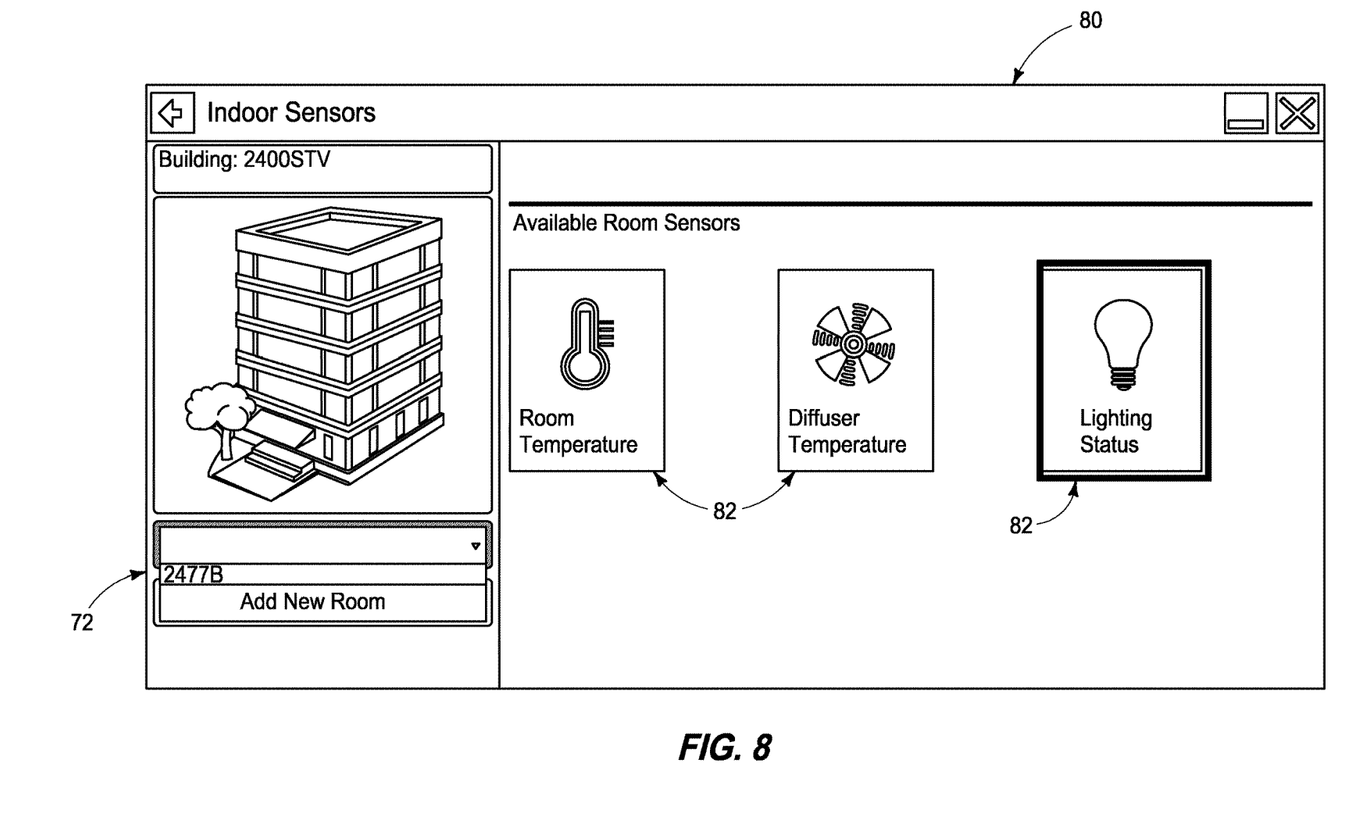
FIG. 8 is a screenshot of a display screen of a user interface for selecting a type of sensor device for installation within a building according to one embodiment.

Referring to FIG. 8, a screenshot 80 is shown where the user has selected the newly added room via the dropdown interface in window 72, and thereafter the user uses icons 82 to select the type of environment data to be collected by the sensor device currently being installed in the selected room (e.g., room temperature, diffuser temperature, lighting status).

Referring to FIG. 9, a screenshot 90 is shown as a result of the user selecting the lighting status interface 82 of FIG. 8. Screenshot 90 includes a window 92 which provides textual installation instructions to assist the user with the installation of the sensor device to generate and store lighting environment data. Other types of installation instructions may be provided such as graphical instructions or photographs to assist the user with the installation of the sensor device. Additionally, the installation instructions are different for installation of the sensor devices to generate and collect other types of environment data, such as temperature or vibrations.

After the user has read the installation instructions, they determine where the sensor device is to be installed in the room in accordance with the installation instructions. Thereafter, the user selects the "Activate" button 94 which results in the display of screenshot 100 of FIG. 10.

Figure 10:
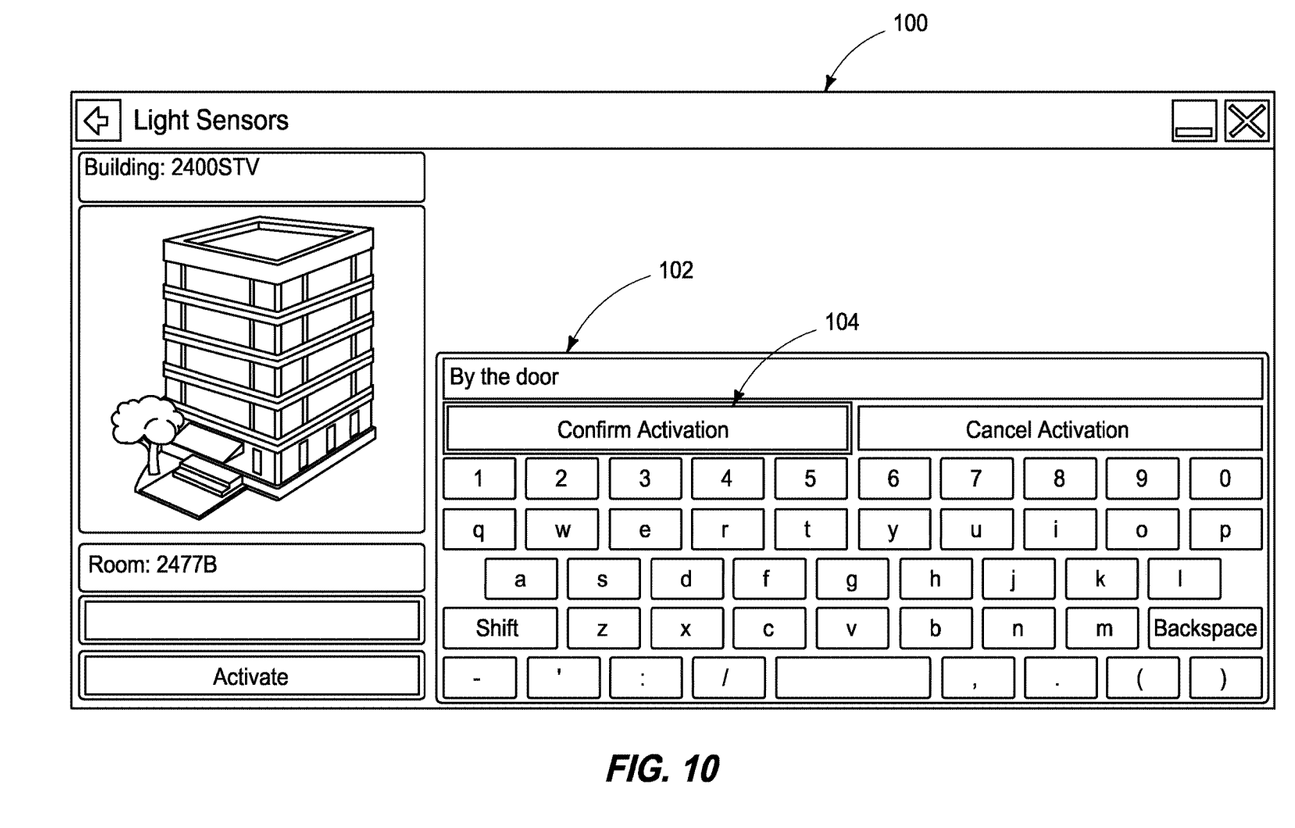
FIG. 10 is a screenshot of a display screen of a user interface for defining a location within a room where a sensor device is to be installed according to one embodiment.

Referring to FIG. 10, the screenshot includes an interface 102 where the user provides location information where the sensor device will be installed in the room (e.g., "By the door" in the illustrated example). Thereafter, the user selects the "Confirm Activation" button 104 to activate the sensor device.

Following the selection of the "Confirm Activation" button 104, the location information entered by the user (e.g., building name, room name, packaged unit name, location of installation in a room) are downloaded from the user interface apparatus 34 to the base system 32. The base system 32 provides the downloaded location information to the respective sensor device 20 which will be installed by the user for storage using storage circuitry of the respective sensor device 20. In addition, the base system 32 also receives an instruction from the user interface apparatus 34 which identifies the type of environment data to be generated and collected by the sensor device 20 which is currently being installed. In one embodiment, processing circuitry of the sensor device 20 may activate an appropriate one of the temperature sensor, light sensor or vibration sensor in accordance with the selection made by the user to generate and store the appropriate type of environment data.

The sensor devices 20 may each include LEDs or other status indicators which may assist the user with the installation of the sensor devices 20. For example, following the downloading of the location information and configuration information to the sensor device 20 currently being installed, the status indicator of the respective sensor device 20 may be illuminated which identifies which one of the sensor devices 20 is to be installed. The user thereafter removes the proper sensor device 20 from the base system 32 and installs the sensor device 20 in the room in accordance with the installation instructions. In at least one embodiment, the sensor device 20 begins collecting data after a predefined amount of time (e.g., 2 minutes) has elapsed following the completion of the activation of the sensor device 20, and the user installs the device within this predefined amount of time. In one embodiment, an adhesive may be used to attach the sensor device 20 to a wall or ceiling of the building in accordance with the installation instructions.

As mentioned above, the collected environment data may include vibration data generated by vibration sensor 62 during operations of the HVAC system, such as a packaged unit. This vibration data is processed, for example by processing circuitry of analysis device 36, to provide information which indicates the operational mode of the HVAC system (e.g., off, ventilation or on for cooling or heating) which may be used during the commissioning or retro-commissioning of a building.

In one embodiment, the vibration sensor 62 is a three axis accelerometer generating separate waveforms (acceleration vs. time) for each of its three directional axes, as well as reporting the accelerometer's temperature. A set of 256 data points is periodically collected from each of the three accelerometer waveforms using an analog to digital converter of the sensor device. Separately for each of the three axes, the set of data points is normalized to correct for temperature induced gain differences and DC components, and a variance value (also referred to as data value) is computed on the set of data points for each of the axes.

The result of the variance computation is a single variance value for the 256 data point waveform sample for each of the three axes. A total of three variance values is computed and stored representing the amount of vibrational energy of the packaged unit of the HVAC system in each of three axes at the time of the periodic sample.

The process is continuously repeated to provide a plurality of data/variance values which are indicative of the operations of the HVAC system and indicate the amount of vibration energy of the packaged unit of the HVAC system at a plurality of different moments in time during the collection of environment data of the building. The plurality of variance values for each of the axes determined at the different moments in time are stored in the storage circuitry.

In one more specific implementation, a sample point is taken which consists of a burst of 256 data points for each of X, Y, Z axes, on a regular interval, such as every minute. Each axes burst of data points is normalized as described above. A single variance value is computed for each of the three axes 256 data point burst and the resulting three variance values for the minute's sample point for the respective axes are stored using the storage circuitry of the sensor device.

Following the capture of the vibration data, the complete time sequence of variance values for each of the three axes is scanned to determine which axis or set of axes revealed the largest regular energy changes, and the data points of the identified axis or set of axes are combined to compute a vibrational energy level for the packaged unit for each time point.

The vibration energy level points for the entire time period of the data collection process are scanned to define three distinct vibrational energy thresholds corresponding to operational modes of the packaged unit of Off (when no vibrational energy is imposed on the packaged unit), Ventilating (where weak vibrational energy from the blower is imposed on the packaged unit), and On (heating/cooling—where significant vibrational energy from the compressor and evaporator/condenser fan is imposed on the packaged unit). The operational modes of the packaged unit are then determined for each sample period by comparing the individual vibrational energy data points to the threshold values determined earlier.

In one more specific embodiment, a first threshold separates the Off and Ventilating modes where vibrational energy sample points with values smaller than the first threshold are considered to indicate that the packaged unit is off. A second threshold defines the maximum amount of vibrational energy of the Ventilating mode where vibrational energy sample points with values smaller than the second threshold but larger than the first threshold are considered to indicate that the package unit is operating in the Ventilating mode. A third threshold indicates a minimum amount of vibration energy corresponding to an On state of the packaged unit where vibrational energy sample points with values greater than the third threshold are considered to indicate that the packaged unit is On (heating/cooling).

In one embodiment, the third threshold serves to provide a diagnostic function. In particular, the amount of vibrational energy of the packaged unit operating in the On operational mode is much greater than the amount of vibrational energy of the packaged unit operating in the Ventilating mode. The third threshold provides a diagnostic function of indicating a potential problem, such as poor sensor attachment, if a significant number of vibration energy points are present between the second and third thresholds.

Additional details of determination of the thresholds are described below according to one embodiment. Initially, the vibrational energy data points are scanned to identify and discard outlier points. Thereafter, a histogram of remaining vibrational energy data points is generated (and the size of the bins of the histogram may be increased if there are empty histogram bins). The regions which contain no or few data points are identified and a large region in the upper range of values which holds none or few data points may be selected as the third threshold described above. Further, the lower bound of the data points includes a broad region where there are none or few data points just above a significant cluster of points which is used as the second threshold. A region of none or few data points near the bottom of histogram values is the first threshold. The determined first, second and third thresholds are used to determine the operational mode of the package unit if they are within expected ranges, otherwise pre-programmed default values are used as the first, second and/or third thresholds.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A building environment data collection system comprising:

a plurality of sensor devices configured to generate and store different types of environment data from different locations of a building;
a base system comprising:
a plurality of interface devices configured to couple with the sensor devices and receive the environment data from the sensor devices;
storage circuitry configured to store the environment data; and
communications circuitry configured to implement communications externally of the base system; and
a user interface apparatus comprising:
communications circuitry configured to communicate with the communications circuitry of the base system;
a user interface configured to display information for observation by a user and to receive user inputs during installation of the sensor devices in the different locations of the building; and
processing circuitry configured to control the user interface to generate the displayed information and to process the user inputs received via the user interface; and
wherein different ones of the sensor devices are configured to generate the different types of environment data as a result of the user inputs.

2. The system of claim 1 wherein the user interface receives a plurality of additional user inputs which include location information which identify the different locations of the sensor devices in the building, and the location information for one of the sensor devices is stored using storage circuitry of the one of the sensor devices.

3. The system of claim 1 wherein the user inputs activate different sensors of the sensor devices to generate the different types of environment data.

4. The system of claim 1 wherein the processing circuitry is configured to control the user interface to depict respective ones of a plurality of different installation instructions as a result of the user inputs instructing different ones of the sensor devices to collect the different types of environment data.

5. The system of claim 1 wherein the user inputs configure the sensor devices to generate the different types of environment data including lighting data, temperature data and vibration data.

6. The system of claim 1 wherein the sensor devices generate the environment data at a plurality of moments in time which are separated from one another by a common interval.

7. The system of claim 6 wherein the sensor devices are configured to generate the different types of environment data according to different intervals.

8. The system of claim 1 wherein the sensor devices individually comprise storage circuitry which stores the environment data generated by the respective individual sensor device.

9. The system of claim 8 wherein the storage circuitry of the sensor devices stores time data associated with environment data and which is indicative of the time of generation of the environment data.

10. The system of claim 1 wherein one of the sensor devices is configured to generate one of the different types of environment data in the building and the one of the sensor devices is configured to generate another of the different types of environment data in another building.

11. The system of claim 1 wherein one of the sensor devices generates and stores only a first of the different types of environment data and a second of the sensor devices generates and stores only a second of the different types of environment data.

12. The system of claim 1 wherein one of the sensor devices is configured to generate vibration data which is indicative of vibrations of a HVAC system and is useable to determine the operational mode of the HVAC system.

13. A building environment data collection system comprising:
a plurality of sensor devices configured to generate and store different types of environment data from different locations of a building;
a base system comprising:
a plurality of interface devices configured to couple with the sensor devices and receive the environment data from the sensor devices;
storage circuitry configured to store the environment data; and
communications circuitry configured to implement communications externally of the base system; and
a user interface apparatus comprising:
communications circuitry configured to communicate with the communications circuitry of the base system;
a user interface configured to display information for observation by a user and to receive user inputs during installation of the sensor devices in the different locations of the building;
storage circuitry storing different installation instructions to assist the user with installation of the sensor devices to collect the different types of environment data;
processing circuitry configured to control the user interface to generate the displayed information and to process the user inputs received via the user interface; and
wherein the processing circuitry is configured to control the user interface to depict respective ones of the different installation instructions as a result of the user inputs instructing different ones of the sensor devices to collect the different types of environment data.

14. The system of claim 13 wherein the user interface receives a plurality of additional user inputs which include location information which identify the different locations of the sensor devices in the building, and the location information for one of the sensor devices is stored using storage circuitry of the one of the sensor devices.

15. The system of claim 13 wherein the user inputs configure the sensor devices to generate the different types of environment data include lighting data, temperature data and vibration data.

16. The system of claim 13 wherein the sensor devices generate the environment data at a plurality of moments in time which are separated from one another by a common interval.

17. The system of claim 16 wherein the sensor devices are configured to generate the different types of environment data according to different intervals.

18. The system of claim 13 wherein the sensor devices individually comprise storage circuitry which stores the environment data generated by the respective individual sensor device.

19. The system of claim 18 wherein the storage circuitry of the sensor devices stores time data associated with environment data and which is indicative of the time of generation of the environment data.

20. A building environment data processing method comprising:

accessing a plurality of data values which are indicative of an amount of vibration energy of a HVAC system at a plurality of different moments in time;

processing the data values to identify a plurality of thresholds; and comparing individual ones of the data values with respect to the thresholds to identify an operation of the HVAC system in one of a plurality of different operational modes at the different moments in time.

21. The method of claim 20 wherein the data values correspond to a plurality of different axes, and the processing comprises identifying at least one of the axes as comprising the data values which contain an increased amount of the vibration energy of the HVAC system compared with the data values of another of the axes.

22. The method of claim 21 wherein the processing and comparing comprise processing and comparing using only the data values of the identified at least one axis.

23. The method of claim 20 wherein the comparing identifies the operation of the HVAC system in the different operational modes including: Off, Ventilating and On at the different moments in time.

24. The method of claim 20 further comprising using the data values to identify a potential problem regarding installation of a sensor device which sensed the vibrations of the HVAC system.

25. A non-transitory storage media storing executable instructions which program processing circuitry to perform the method of claim 20.

26. The system of claim 1 wherein each of the sensor devices comprises a temperature sensor configured to generate temperature environment data, a light sensor configured to generate lighting environment data, and a vibration sensor configured to generate vibration environment data.

27. The system of claim 26 wherein each of the sensor devices is configured to activate one of the temperature sensor, the light sensor, and the vibration sensor to generate a respective one of the temperature environment data, the lighting environment data, and the vibration environment data as a result of the user inputs.

28. The system of claim 26 wherein a first of the sensor devices is configured to generate one of the temperature environment data, the lighting environment data, and the vibration environment data and a second of the sensor devices is configured to generate another of the temperature environment data, the lighting environment data, and the vibration environment data.

29. The system of claim 4 wherein the depicted installation instructions include instructions regarding placement of the different ones of the sensor devices at different locations in one or more rooms of the building.

* * * * *